(12) United States Patent
Callingham (10) Patent No.: US 10,015,954 B2
(45) Date of Patent: Jul. 10, 2018

(54) DEVICE FOR RETRIEVING FISH

(71) Applicant: John Charles Callingham, Sapphire Beach (AU)

(72) Inventor: John Charles Callingham, Sapphire Beach (AU)

( * ) Notice: Subject to any disclaimer, the term of this patent is extended or adjusted under 35 U.S.C. 154(b) by 168 days.

(21) Appl. No.: 14/376,763

(22) PCT Filed: Feb. 6, 2013

(86) PCT No.: PCT/AU2013/000101
§ 371 (c)(1),
(2) Date: Aug. 5, 2014

(87) PCT Pub. No.: WO2013/116896
PCT Pub. Date: Aug. 15, 2013

(65) Prior Publication Data
US 2015/0013208 A1    Jan. 15, 2015

(30) Foreign Application Priority Data
Feb. 6, 2012   (AU) .................................. 2012900420

(51) Int. Cl.
*A01K 77/00* (2006.01)
*A01K 97/00* (2006.01)
*A01K 99/00* (2006.01)
*A01K 87/00* (2006.01)
*A01K 97/14* (2006.01)
*A01K 74/00* (2006.01)

(52) U.S. Cl.
CPC ............ *A01K 87/007* (2013.01); *A01K 74/00* (2013.01); *A01K 77/00* (2013.01); *A01K 97/00* (2013.01); *A01K 97/14* (2013.01); *A01K 99/00* (2013.01)

(58) Field of Classification Search
CPC ................................ A01K 77/00; A01K 97/00
USPC ..................................................... 43/5, 7, 11
See application file for complete search history.

(56) References Cited

U.S. PATENT DOCUMENTS

| | | | | |
|---|---|---|---|---|
| 1,797,251 A | * | 3/1931 | Tyrrell | A01K 77/00 43/5 |
| 2,626,477 A | * | 1/1953 | Richardson | A01K 77/00 43/5 |
| 2,641,078 A | * | 6/1953 | Gearien | A01K 97/14 43/5 |
| 2,921,397 A | * | 1/1960 | Luthi | A01K 77/00 43/11 |
| 3,363,355 A | * | 1/1968 | Kellner | A01K 77/00 43/5 |

(Continued)

FOREIGN PATENT DOCUMENTS

| | | | | |
|---|---|---|---|---|
| GB | 1102669 A | * | 2/1968 | ............ A01K 77/00 |
| GB | 2479764 A | * | 10/2011 | ............ A01K 77/00 |

(Continued)

OTHER PUBLICATIONS

Translation of JP 2006-25739.*
Translation of JP 2005-237262.*

*Primary Examiner* — Darren W Ark
(74) *Attorney, Agent, or Firm* — DeLio, Peterson & Curcio, LLC; David R. Pegnataro (57) ABSTRACT

The present invention is directed to a device for retrieving a fish caught on a fishing line, the device including a receptacle for passing along the fishing line and then receiving the caught fish, and a retriever for retrieving the receptacle and the fish.

11 Claims, 7 Drawing Sheets

(56) References Cited

U.S. PATENT DOCUMENTS

| | | | | | |
|---|---|---|---|---|---|
| 3,389,491 | A | * | 6/1968 | Lowrey | A01K 97/14 43/5 |
| 3,911,608 | A | * | 10/1975 | Holling | A01K 97/14 43/5 |
| 3,921,943 | A | * | 11/1975 | Munro | B64D 1/22 114/240 R |
| 4,063,380 | A | * | 12/1977 | Grim | A01K 77/00 43/11 |
| 4,292,753 | A | * | 10/1981 | Yesuratnam | A01K 77/00 43/5 |
| 4,637,155 | A | * | 1/1987 | Johnson | A01K 97/20 43/7 |
| 4,653,214 | A | * | 3/1987 | Cline | A01K 77/00 43/11 |
| 5,419,074 | A | * | 5/1995 | Thomas | A01K 77/00 43/5 |
| D367,102 | S | * | 2/1996 | McLeaf | D22/135 |
| 7,337,576 | B2 | * | 3/2008 | Boltan | A01K 77/00 43/5 |
| 8,887,434 | B2 | * | 11/2014 | Waugh | A01K 77/00 43/6 |
| 8,943,734 | B2 | * | 2/2015 | Sorvik | A01K 91/18 43/5 |
| 2006/0260172 | A1 | * | 11/2006 | Hufe, Jr. | A01K 77/00 43/5 |
| 2014/0325891 | A1 | * | 11/2014 | Waugh | A01K 77/00 43/55 |

FOREIGN PATENT DOCUMENTS

| | | | | |
|---|---|---|---|---|
| JP | 06078652 | A | * | 3/1994 |
| JP | 07059489 | A | * | 3/1995 |
| JP | 2001269082 | A | * | 10/2001 |
| JP | 2005237262 | A | * | 9/2005 |
| JP | 2006025739 | A | * | 2/2006 |
| JP | 2011041492 | A | * | 3/2011 |

* cited by examiner

DEVICE FOR RETRIEVING FISH

TECHNICAL FIELD

The present invention relates to a device for retrieving a fish which is caught on a fishing line.

BACKGROUND ART

Once a fisherman catches a fish on a fishing line, the fisherman can retrieve the fish by winding in the fishing line if the fish is fairly small and light. For bigger and heavier fish, the fisherman may use a landing net or a gaff hook to retrieve the caught fish from the water.

A landing net includes a net attached to a rigid frame and handle. The landing net can be used to scoop up a caught fish. A gaff hook includes a sharp and rigid hook attached to the end of a handle. The hook is used to puncture a caught fish so as to secure the fish onto the hook, and the handle is used to lift the hooked fish out of the water.

Once the fish is caught on the fishing line, the fisherman winds in the fishing line so as to bring the caught fish closer to the fisherman. Once the caught fish is sufficiently close, the fisherman can land the fish either by scooping up the fish using a landing net or hooking the fish using a gaff hook.

One common problem with landing nets and gaff hooks is that the respective handles can often be too short to reach a caught fish from elevated fishing positions, such as an elevated landing, deck, jetty, bridge, cliff top or a large boat.

It can also sometimes be difficult to land a fairly large and heavy fish using a landing net. In particular, if the landing net is too small, the large caught fish may not properly fit within the landing net or may easily escape from the landing net.

Moreover, gaff hooks are not suitable for use in "Catch and Release" recreational fishing in which the caught fish is released back into the water after being captured. In particular, the gaff hook may fatally puncture the fish during retrieval and thereby seriously hamper the chances of survival of the punctured fish.

The present invention is directed to a device for retrieving a fish caught on a fishing line, which may at least partially overcome at least one of the abovementioned disadvantages or provide the consumer with a useful or commercial choice.

It will be clearly understood that, if a prior art publication is referred to herein, this reference does not constitute an admission that the publication forms part of the common general knowledge in the art in Australia or in any other country.

SUMMARY OF INVENTION

According to a first aspect of the invention, there is provided a device for retrieving a fish caught using a fishing line, the device including
  a receptacle for passing along the fishing line and then receiving the caught fish, and
  a retriever for retrieving the receptacle and the fish.

Advantageously, the device can be used to retrieve caught fish from elevated positions as the receptacle can simply be passed along the fishing line to receive the caught fish at the end of the fishing line. Moreover, the receptacle can be used to receive the caught fish safely without causing injury to the caught fish. Therefore, the device according to the present invention can be safely used from a variety of fishing locations for any type of fishing, in particular "catch and release" recreational fishing.

The device may be collapsible. Advantageously, the device may be collapsed into a compact size for ease of storage and transportation.

The receptacle may be a tapered sleeve. Advantageously, the tapered sleeve may guide the fish into a tapered end of the sleeve.

The receptacle may be a sleeve having two open ends, the two open ends allowing the fishing line to pass through the sleeve such that the sleeve can travel along the fishing line to receive the caught fish.

The receptacle may include a ring at a first end thereof so as to maintain the first end in an open position.

The receptacle may include a retaining portion at a second end thereof for retaining the head of the caught fish. The retaining portion may be configured to divide the second end of the receptacle into a plurality of sections such that the head of the caught fish can be retained in one of the plurality of sections.

The retriever may include a line for retrieving the receptacle and the fish, the line having a first attachment portion attached to a first end of the receptacle, and a second attachment portion attached to a second end of the receptacle. The second attachment portion may be removably attached to the second end of the receptacle. Furthermore, the second attachment portion may include a gripping portion for removably gripping the second end of the receptacle.

The line may include a rod connected between the first and second attachment portions. In particular, the line may include a first portion and a second portion, the first portion being a rope connected to the second attachment portion, the second portion being a rod connected between the first attachment portion and the second attachment portion.

The rod may be flexible. The rod may be length adjustable. Moreover, the rod may be foldable.

According to another aspect of the invention, there is provided a method for retrieving a fish caught using a fishing line, the method including
  passing a receptacle along the fishing line to receive the caught fish, and
  retrieving the receptacle and the fish.

Before the step of passing, the method may include threading the fishing line through a sleeve of the receptacle.

The step of receiving may include receiving the caught fish head first through a first end of the receptacle, and retaining the head of the caught fish at a second end of the receptacle.

The step of retrieving may include pulling on a line which is attached to two ends of the receptacle, and detaching the line from one of the two ends of the receptacle. Moreover, the step of retrieving may include retrieving the fish tail first.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1A:
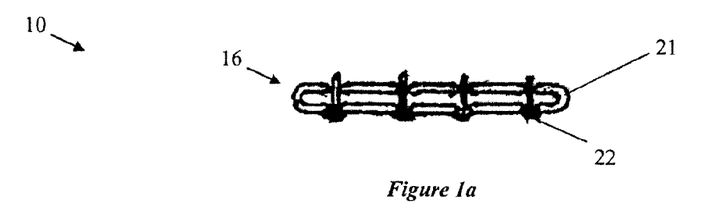
FIGS. 1a, 1b and 1c are respective top, side and bottom views of a device for retrieving a fish caught on a fishing line according to one embodiment of the present invention.
Figure 1B:
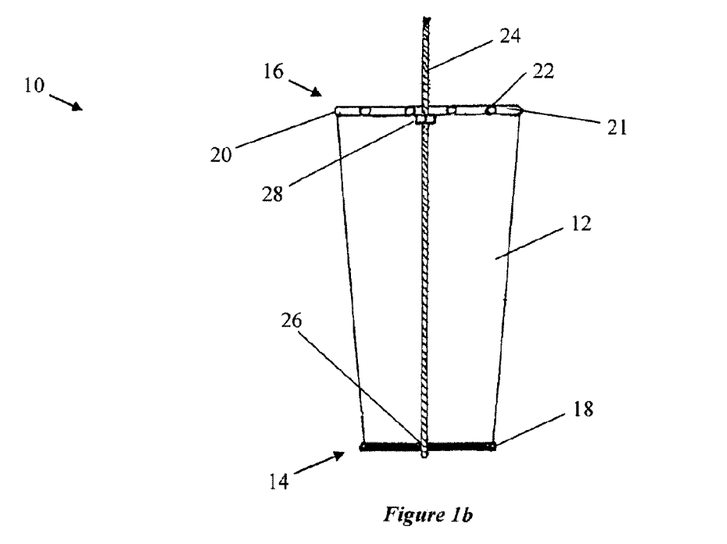
Figure 1C:
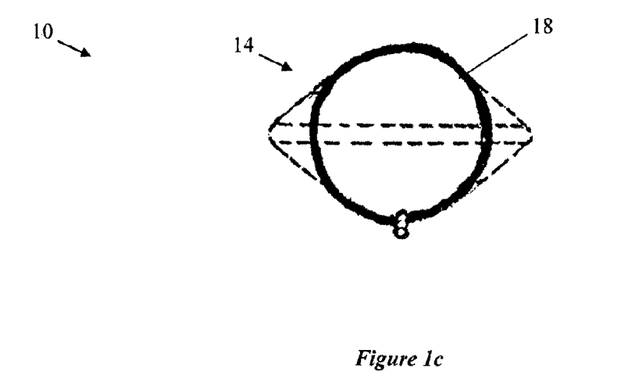

FIGS. 1a, 1b and 1c illustrate respective top, side and bottom views of a device 10 for retrieving a fish caught on a fishing line according to one embodiment of the present invention. The device 10 includes a receptacle in the form of a sleeve 12 for passing along the fishing line and then receiving the caught fish. The sleeve 12 is tapered and typically made from a tough canvas or netting so as to prevent the weight of the caught fish from tearing the sides of the sleeve 12 and escaping from the sleeve 12.

The sleeve 12 includes a first open end 14 and a second open end 16. The fishing line is threaded through the first and second open ends 14, 16 to enable the sleeve 12 to follow the path of the fishing line as it is being passed along the fishing line.

The first open end 14 includes a ring 18 for holding the first open end 14 in its open position. The ring 18 is typically sized to enable entrance of large fish species. Therefore, the circumference of the ring 18 would typically be greater than the average girth of greater fish species. The second open end 16 includes a retaining portion 20 including an adjustable end portion 21 and four fasteners 22 for fastening together opposite sides of the end portion 21 such that the second open end 16 is divided into five opening sections as shown in FIG. 1a.

When the fish is received within the sleeve, the head of the fish can be retained in one of the five opening sections (e.g. the centre section) as the sleeve 12 and the fish is retrieved from the water. This will be explained in further detail below.

Advantageously, the number of fasteners 22 used to fasten together the opposite sides of the end portion 20 can be reduced or increased to change the size of the opening sections to retain the head of different size fish.

The device 10 further includes a retriever in the form of a line 24 for retrieving the sleeve 12 and the fish. The line 24 has a first attachment portion 26 permanently attached to the first open end 14 of the sleeve 12. The line 24 also includes a second attachment portion 28 removably attached to the second open end 16 of the sleeve 12.

The configuration of the line 24 allows the sleeve 12 to be passed along the fishing line with the first open end 14 facing the caught fish so as to allow the fish to be received in the sleeve 12 head first. Once the fish is received in the sleeve 12 with the head of the fish adjacent the second open end 16 and the tail of the fish adjacent the first open end 14, tension can be applied to the line 24 to detach the second attachment portion 28 from the second end 16. Once the second attachment portion 28 is detached from the sleeve 12, the weight of the fish within the sleeve 12 causes the sleeve 12 to flip over. The retaining portion 20 retains the fish within the sleeve 12 by holding the head of the fish within one of the opening sections. The other opening sections allow water to flow out of the sleeve 12. The sleeve 12 and the fish are then retrieved from the water by winding in the line 24.

Figure 2:
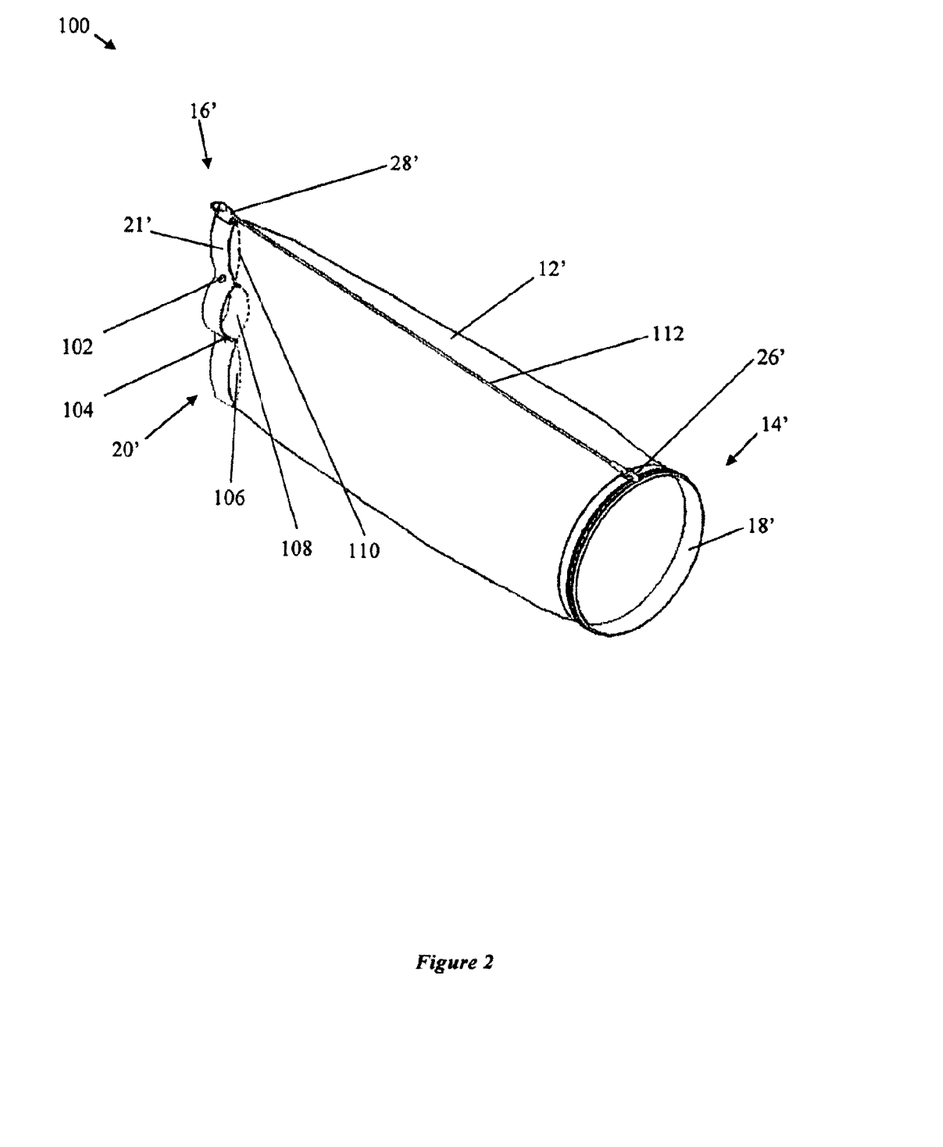
FIG. 2 is a perspective view of a device for retrieving a fish caught on a fishing line according to another embodiment of the present invention.

FIG. 2 illustrates a device 100 for retrieving a fish caught on a fishing line according to another embodiment of the present invention. In FIG. 2, like numerals refer to like features previously described.

The device 100 includes a sleeve 12' having a first open end 14' and a second open end 16'. The first open end 14' includes a ring portion 18' for maintaining the first open end 14' in its open position to receive the caught fish. The second open end 16' includes a retaining portion 20'. The retaining portion 20' includes an adjustable end portion 21' and fasteners 102, 104. The two fasteners 102, 104 fasten together opposite sides of the adjustable end portion 21' to create three opening sections 106, 108, 110. The fishing line can be threaded through the first open end 14' and one of the three opening sections 106, 108, 110 at the second open end 16' so that the sleeve 12' can be passed along the fishing line to receive the caught fish.

The device 100 further includes a flexible rod 112 having a first attachment portion 26' attached to the ring portion 18' at the first open end 14' of the sleeve 12', and a second attachment portion 28' removably attached to the retaining portion 20' at the second open end 16' of the sleeve 12'. A line portion such as a rope (not shown) is attached to the second attachment portion 28' so that a pull on the rope can release the second attachment portion 28' from the sleeve 12 prior to retrieving the sleeve 12 and the caught fish.

Figure 3:
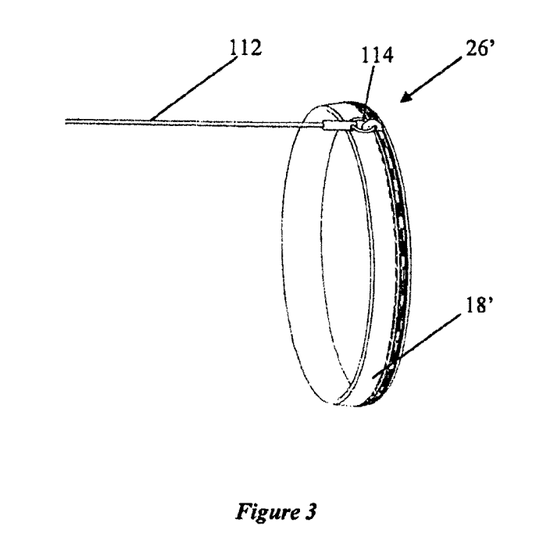
FIG. 3 is a close up view of an attachment portion of the device shown in FIG. 2.

FIG. 3 is a close up view of the first attachment portion 26'. The flexible rod 112 is attached to the ring portion 18' via attachment ring 114.

Figure 4:
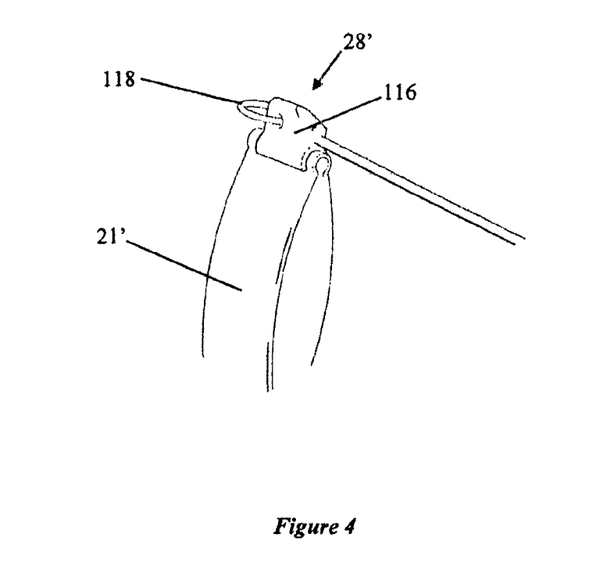
FIG. 4 is close up view of another attachment portion of the device shown in FIG. 2.

FIG. 4 is a close up view of the second attachment portion 28'. The second attachment portion 28' includes a gripping portion 116 for gripping onto the adjustable end portion 21'. A rope (not shown) is connected to the gripping portion 116 via attachment ring 118. When the rope is pulled with a sufficient force, the gripping portion 116 is released from the adjustable end portion 21'.

Figure 5:
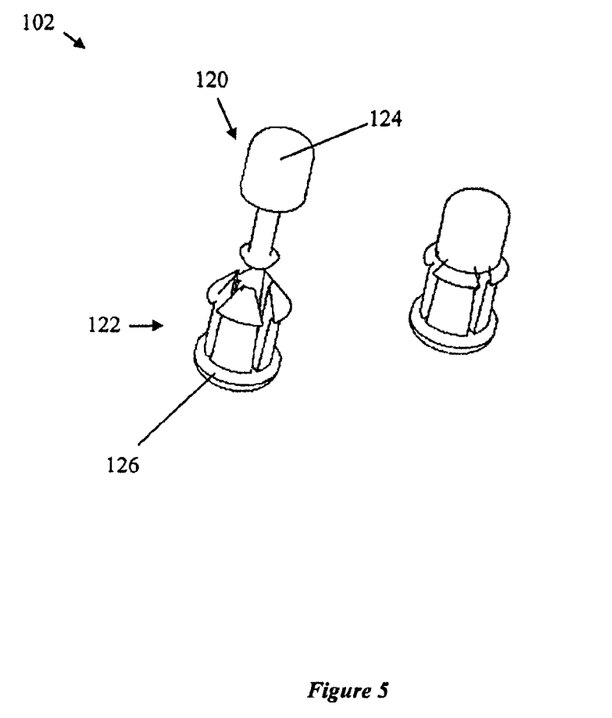
FIG. 5 is a perspective view of a fastener on the device as shown in FIG. 2.

FIG. 5 is a perspective view of one of the fasteners 102 of the retaining portion 20'. The fasteners 102, 104 can be conveniently removed from the adjustable end portion 21' once the caught fish has been successfully landed so as to remove the fish from the sleeve 12. The fasteners 102, 104 can be subsequently re-attached to the adjustable end portion 21' for reuse.

The fastener 102 includes a pin 120 and a retainer 122 for retaining the pin 120. To fasten two opposite sides of the adjustable end portions 21' together, the retainer 122 is received in a pair of matching openings on opposite sides of the adjustable end portion 21', the pin 120 is then inserted into and retained by the retainer 122. The enlarged head 124 of the pin 120 and the enlarged base 126 of the retainer prevent the fastener 102 from being inadvertently removed from the adjustable end portion 21'.

Figure 6A:
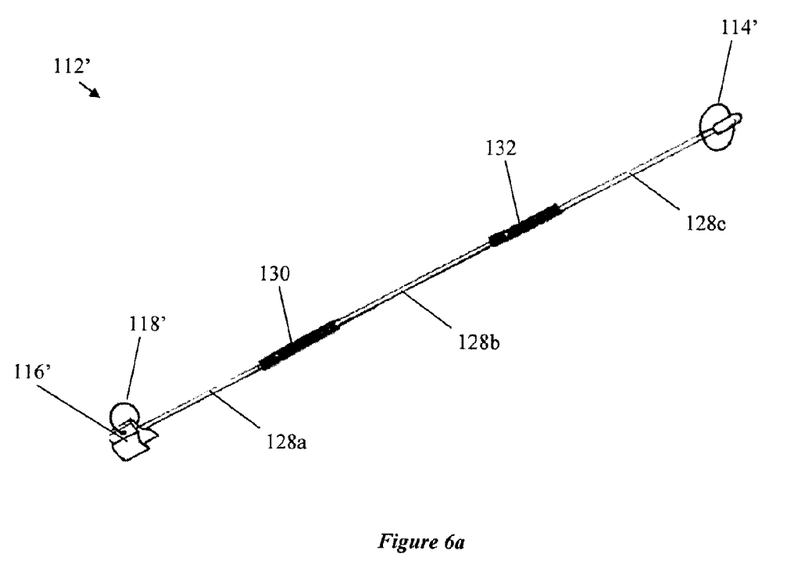
FIGS. 6a and 6b are perspective views of a foldable rod of the device for retrieving a fish caught on a fishing line according to a further embodiment of the present invention.
Figure 6B:
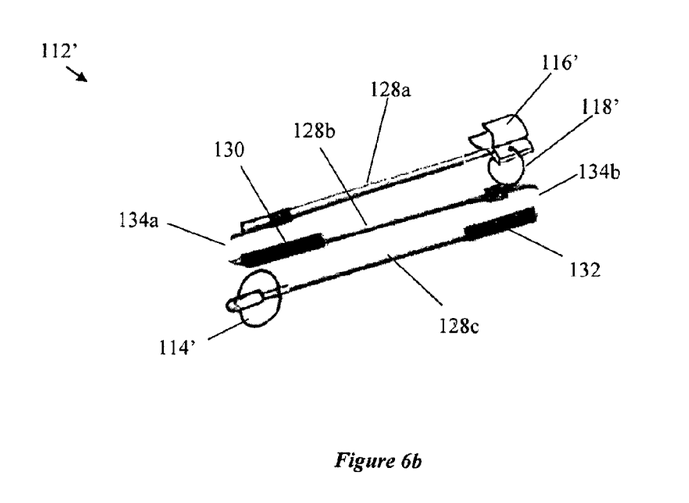

FIGS. 6a and 6b illustrate a foldable rod 112'. In FIGS. 6a and 6b, like numerals refer to like features previously described.

In one embodiment of the invention, the flexible rod 112 as shown in FIGS. 2 to 4 can be replaced by a foldable rod 112' as shown in FIGS. 6a and 6b so the device 100 can be collapsed/folded into a compact and small size for ease of storage and transportation.

The foldable rod 112' includes three rod sections 128a, 128b, 128c connected together via flexible linkages such as ropes 134a, 134b. The foldable rod 112' further includes movable sleeves 130, 132 which are slidable to move the foldable rod 112' between its expanded position (FIG. 6a) and its folded position (FIG. 6b).

In the expanded position as shown in FIG. 6a, the sleeves 130, 132 are moved into an engaged position whereby the sleeve 130 connects the rod section 128a with rod section 128b, and the sleeve 132 connects rod section 128b with rod section 128c.

In the folded position as shown in FIG. 6b, the sleeves 128 are moved into a disengaged position whereby the sleeve 130 is disconnected from the rod section 128a, and the sleeve 132 is disconnected from the rod section 128b. In this folded position, rod sections 128a, 128b, 128c are separated and the flexibility of the ropes 134a, 134b allow the rod portions 128a, 128b, 128c to be folded together in a compact configuration.

A method of using the device 10 for retrieving a fish caught on a fishing line will now be described in relation to FIGS. 7 and 8.

Figure 7:
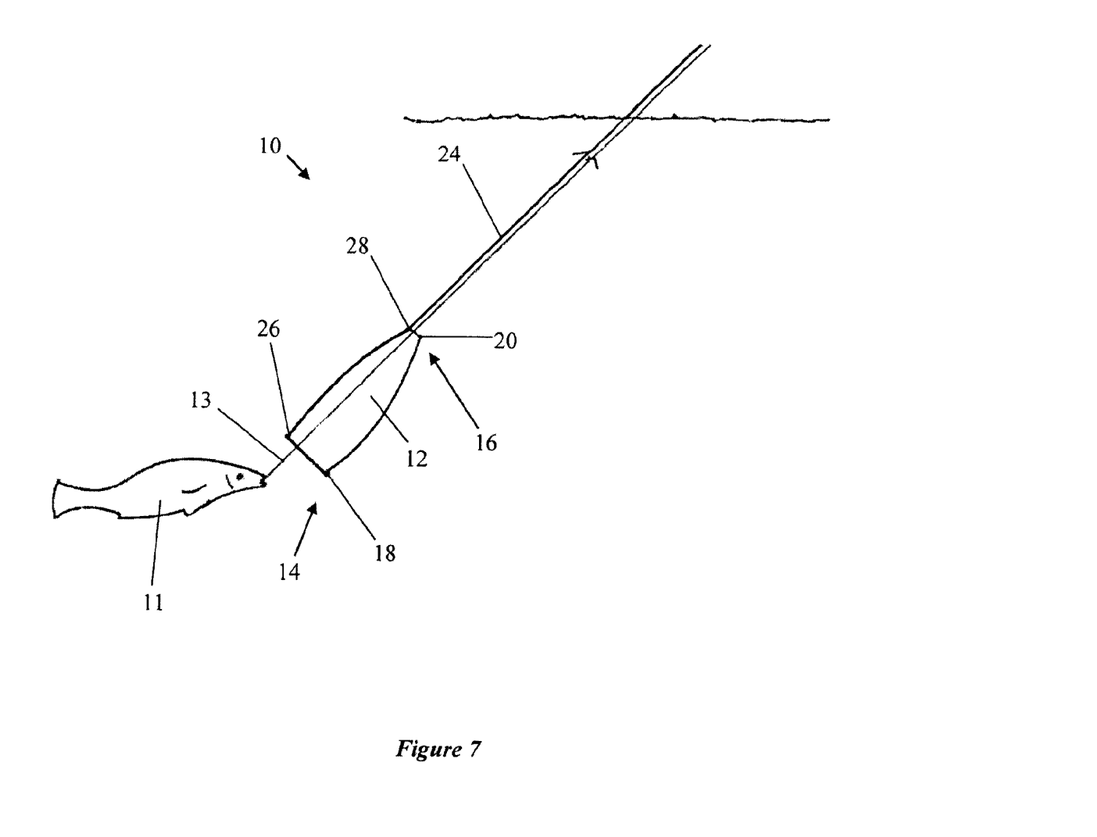
FIG. 7 illustrates a first step in the method of using the device as shown in FIGS. 1a to 1c.

As shown in FIG. 7, the fishing line 13 is first passed through the first and second open ends 14, 16 of the sleeve 12 and the sleeve 12 is passed towards the caught fish 11 along the fishing line 13. The weight of the ring 18 at the first open end 14 assists the movement of the sleeve 12 towards the caught fish 13.

As the sleeve 12 reaches the end of the fishing line 13, the fish 11 is received in the sleeve 12 head first. When the fish 11 is fully received in the sleeve 12, the head of the fish 11 is adjacent the second open end 16 of the sleeve 12, and the tail of the fish 11 is adjacent the first open end 14 of the sleeve 12.

Once the fish 11 is fully received in the sleeve 12, the fisherman pulls on the line 24 to cause the second attachment portion 28 to detach from the sleeve 12. The weight of the fish then causes the sleeve 12 to flip over such that the head of the fish 11 is retained in the retaining portion 20 as shown in FIG. 8.

Figure 8:
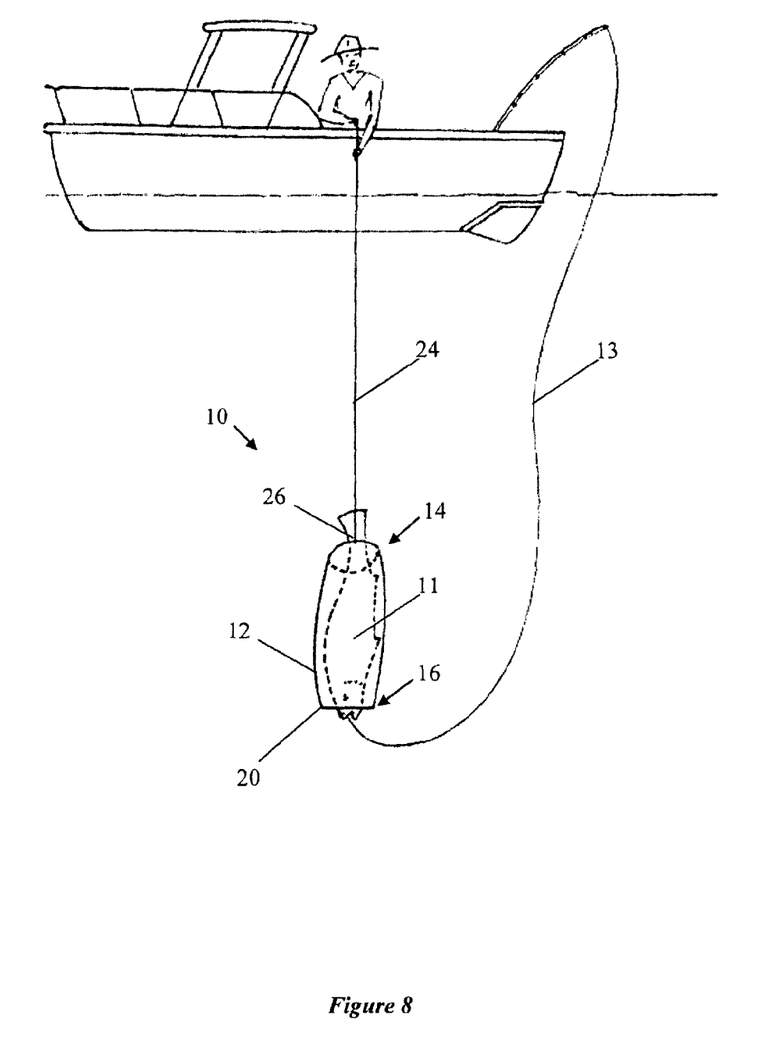
FIG. 8 illustrates a second step in the method of using the device as shown in FIGS. 1a to 1c.

As shown in FIG. 8, once the fish 11 and the sleeve 12 flips over, the sleeve 12 and the caught fish 11 can be retrieved by winding in the line 24. As the line 24 is still attached via the first attachment point 26 to the first open end of the sleeve 12, the fish 11 is safely retrieved tail first from the water. Advantageously, the two open ends 14, 16 allow water to easily flow through the sleeve 12 to reduce the resistance on the sleeve 12 when retrieving the fish 11.

Advantageously, the device 10 can be used to retrieve caught fish from elevated positions as the sleeve 12 can simply be passed along the fishing line to receive the caught fish 11 at the end of the fishing line 13. In other words, there is no need for the fisherman to lower himself to the edge of the water before the caught fish can be retrieved. Moreover, the sleeve 12 can be used to receive the caught fish safely without causing injury to the caught fish. Therefore, the device 10 can advantageously be safely used from a variety of fishing locations during "catch and release" recreational fishing.

In a further alternative embodiment, the flexible rod 112 may be telescopic. The second attachment portion 28 may include any suitable attachment means for removably attaching the second attachment portion 28 to the retaining portion 20. For example, clamps, clips, pins or the like may be used.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A device for retrieving a fish caught using a fishing line, the device including:
    an elongate receptacle for passing along the fishing line, the elongate receptacle including an opening at a first end, an opening at a second end, and at least one wall extending between the opening at the first and the opening at the second end to define a sleeve, wherein the opening at the first end is for receiving the caught fish and the opening at the second end includes a retainer for retaining a head of the caught fish, the retainer including an adjustable portion comprising at least one fastener extending through opposing sides of the second end opening to divide the opening at the second end of the receptacle into a plurality of open sections such that the head of the caught fish is retained in one of the plurality of open sections; and
    a retriever line for retrieving the receptacle and the fish, the retriever line having a fixed mounting portion mounted to the first end of the elongate receptacle and a removable mounting portion removably mounted to the second end of the elongate receptacle,
    wherein the receptacle is supported by the retriever line at the receptacle second end and in an upright position to receive the fish into the receptacle when the removable mounting portion is mounted to the receptacle,
    wherein the retriever line is coupled to the first end of the receptacle and not the second end of the receptacle, and supports the receptacle in an inverted position with the opening at the first end of the receptacle located intermediate the retriever line removable mounting portion and the receptacle second end when the removable mounting portion is removed from the receptacle,
    wherein the receptacle is supported by the retriever line such that the receptacle is elongate in a direction parallel to the retriever line when the removable mounting portion is removed from the receptacle and the receptacle is retrieved by the retriever line, and
    wherein the sleeve is configured to define a channel between the first end and the second end through which the water is guided.

2. The device of claim 1, wherein the receptacle is a tapered sleeve.

3. The device of claim 1, wherein the receptacle includes a ring at the first end so as to maintain the first end in an open position.

4. The device as claimed in claim 1, wherein the device is collapsible.

5. The device as claimed in claim 1, wherein the receptacle includes a sleeve made from a canvas material.

6. A method for retrieving a fish caught on a fishing line, the method including:

passing an elongate receptacle along the fishing line to receive the caught fish in an upright position, the receptacle being attached to a retriever line and including an opening at a first end for receiving the caught fish and an opening at a second end including a retainer for retaining a head of the caught fish, the retainer including an adjustable portion comprising at least one fastener extending through opposing sides of the second end opening to divide the opening at the second end of the receptacle into a plurality of open sections such that a head of the caught fish is retained in one of the plurality of open sections, the receptacle further including at least one wall extending between the opening at the first end and the opening at the second end to define a sleeve, the sleeve configured to define a channel between the first end and the second end through which water is guided, the retriever line having a fixed mounting portion and a removable mounting portion, the fixed and removable mounting portions mounted to the first and a second ends of the receptacle respectively, the removable mounting portion being removable from the receptacle such that the receptacle is supported by the retriever line at the receptacle second end and in an upright position when the removable mounting portion is mounted to the receptacle, and the receptacle is supported by the retriever line in an inverted position when the removable mounting portion is removed from the receptacle;

removing the removable mounting portion from the receptacle;

inverting the receptacle and fish by supporting the receptacle by the retriever line at the fixed mounting portion; and retrieving the inverted receptacle and fish by the retriever line and the fixed mounting portion, wherein the retriever line is coupled to the first end of the receptacle and not the second end of the receptacle, and supports the receptacle in an inverted position with the opening at the first end of the receptacle located intermediate the retriever line removable mounting portion and the receptacle second end when the removable mounting portion is removed from the receptacle, and wherein the receptacle is supported by the retriever line such that the receptacle is elongate in a direction parallel to the retriever line when the removable mounting portion is removed from the receptacle and the receptacle is retrieved by the retriever line.

7. The method as claimed in claim 6, wherein before the step of passing, the method includes threading the fishing line through the sleeve of the receptacle.

8. The method as claimed in claim 6, wherein the step of passing further comprises receiving the caught fish head first through the opening at the first end of the receptacle, and retaining the head of the caught fish at a second end of the receptacle.

9. The method as claimed in claim 6, wherein the step of retrieving includes retrieving the fish tail first.

10. The method of claim 6, wherein the receptacle is lowered from an elevated position, and wherein the receptacle and fish are inverted prior to being retrieved to the elevated position.

11. The method of claim 6, wherein pulling on the retriever line causes the removable mounting portion to be removed from the receptacle, which in turn causes the receptacle to flip from the upright position to the inverted position.

* * * * *